United States Patent
Ochs et al.

(10) Patent No.: US 10,761,523 B2
(45) Date of Patent: Sep. 1, 2020

(54) METHOD FOR CONTROLLING AN AUTOMATION SYSTEM

(71) Applicant: Eisenmann SE, Böblingen (DE)

(72) Inventors: Ullrich Ochs, Holzgerlingen (DE); Thomas Stumpfegger, San Jose, CA (US); Fabian Häußler, Böblingen (DE)

(73) Assignee: Eisenmann SE, Boblingen (DE)

(*) Notice: Subject to any disclaimer, the term of this patent is extended or adjusted under 35 U.S.C. 154(b) by 0 days.

(21) Appl. No.: 16/014,517

(22) Filed: Jun. 21, 2018

(65) Prior Publication Data

US 2019/0004506 A1    Jan. 3, 2019

(30) Foreign Application Priority Data

Jun. 22, 2017  (EP) .................................... 17177504

(51) Int. Cl.
 *G05B 19/418* (2006.01)
 *G06F 3/0488* (2013.01)
 (Continued)

(52) U.S. Cl.
 CPC ..... *G05B 19/41885* (2013.01); *G05B 19/418* (2013.01); *G05B 19/41845* (2013.01);
 (Continued)

(58) Field of Classification Search
 CPC ........ G05B 19/41885; G05B 19/41845; G05B 19/418; G05B 2219/23258;
 (Continued)

(56) References Cited

U.S. PATENT DOCUMENTS 6,282,455 B1 * 8/2001 Engdahl ............. G05B 19/4184
                                                              434/72
7,817,150 B2   10/2010 Reichard et al.
(Continued)

FOREIGN PATENT DOCUMENTS

DE      1020121012749 A1   10/2013
JP         2011059820 A  *  3/2011 ........... G06F 1/1626
(Continued)

OTHER PUBLICATIONS

EP Search Report issued in Application Serial No. 17177504.2 dated Dec. 19, 2017.

*Primary Examiner* — Ajay M Bhatia
*Assistant Examiner* — Mong-Shune Chung
(74) *Attorney, Agent, or Firm* — Michael T. Abramson; Holland & Knight LLP (57) ABSTRACT

A method for controlling an automation system (1) comprising: rendering, by a processor, an image (16, 22, 40) from a three-dimensional scene representing at least part of the automation system (1) on the basis of position data and viewing direction data, displaying the image (16, 22, 40) on a display unit (10), wherein the automation system (1) comprises a plurality of components (2, 4, 18, 20), wherein a tree structure (24) is stored in a data memory in which nodes (28, 30, 32, 34) are assigned to the components (2, 4, 18, 20) of the automation system (1), is to process and display all details necessary for the tasks of controlling an automation system and on the other hand minimize the required computing capacity. For this purpose, a focus component is determined, and from the scene only those components (2, 4, 18, 20) of the part of the automation system (1) are loaded into the processor for rendering whose assigned nodes (28, 30, 32, 34) in the tree structure (24) have (Continued)

only a predetermined maximum distance from the node (28, 30, 32, 34) assigned to the focus component.

15 Claims, 4 Drawing Sheets (51) Int. Cl.
*G06T 17/00* (2006.01)
*G06T 19/00* (2011.01)
*G06T 15/00* (2011.01)

(52) U.S. Cl.
CPC .......... *G06F 3/0488* (2013.01); *G06T 15/005* (2013.01); *G06T 17/005* (2013.01); *G06T 19/003* (2013.01); *G05B 2219/23258* (2013.01); *G05B 2219/23377* (2013.01); *G05B 2219/24048* (2013.01); *G05B 2219/31467* (2013.01)

(58) Field of Classification Search
CPC .......... G05B 2219/31467; G05B 2219/24048; G05B 2219/23377; G06T 15/005; G06T 19/003; G06T 19/20; G06T 17/10; G06T 17/005; G06T 2219/2016; G06T 15/00; G06F 3/0488
See application file for complete search history.

(56) References Cited

U.S. PATENT DOCUMENTS

| | | | |
|---|---|---|---|
| 2006/0036615 A1* | 2/2006 | Masselle | G06F 16/904 |
| 2007/0067725 A1* | 3/2007 | Cahill | G05B 23/027 |
| | | | 715/733 |
| 2007/0075995 A1* | 4/2007 | Reichard | G06T 19/00 |
| | | | 345/419 |
| 2013/0321400 A1* | 12/2013 | van Os | G06T 15/005 |
| | | | 345/419 |

FOREIGN PATENT DOCUMENTS

| | | |
|---|---|---|
| WO | 03001334 A2 | 1/2003 |
| WO | 2006001629 A1 | 1/2006 |

\* cited by examiner

METHOD FOR CONTROLLING AN AUTOMATION SYSTEM

CROSS-REFERENCE TO RELATED APPLICATION

The subject application claims the priority of European Patent Application No. 17177504.2, filed on 22 Jun. 2017, the contents of which are herein incorporated by reference in its entirety.

The invention concerns a method for controlling an automation system, comprising: rendering, by a processor, an image from a three-dimensional scene representing at least part of the automation system on the basis of position data and viewing direction data, displaying the image on a display unit, wherein the automation system comprises a plurality of components. It also concerns a computer program product and a control system.

Automation systems are industrial plants in which production and processing steps are fully or partially automated. Depending on the type of products manufactured or processed, an automation system can be highly individually designed. As a rule, however, it consists of processing stations to which the products to be processed or their preliminary stages are transported by means of a conveyor in a certain sequence and processed there. Processing stations and conveyor equipment form the components of the automation system. Such an automation system is e.g. a painting line for motor vehicles. In this case, the processing stations are stations at which a specific task intended in the painting process is carried out, i.e. pretreatment, application of primer, filler, base coat and clear coat. Appropriate machines such as painting robots are available at each station. The vehicle bodies are automatically moved from station to station by means of known conveyor elements.

The control and monitoring of an automation system typically takes place at a control station, where the process sequences are monitored and, if necessary, influenced by a user with the help of appropriate data from the system. A control station has one or more devices or connections to devices at the various stations of the automation system for measuring, regulating, controlling, displaying, alarming, recording, switching or calculating. The display of the process, e.g. in the type of process flow images, is usually carried out using various display units such as screens. In recent times, the advent of mobile devices such as tablets and laptops has also made it possible to display and control processes on such mobile devices, allowing the user to move freely within the automation system. It is also possible to carry out remote monitoring of the system, so that the control station or mobile device need not necessarily be in the close range of the automation system.

For the most part, automation systems are currently shown on the display units in two-dimensional displays. Products and their components are often only indicated. If three-dimensional representations are used, they are often static and show a pseudo-perspective view (often also referred to as 2½-D). Such a display is often not very intuitive for the user, especially on mobile devices on site in the plant.

In recent times, therefore, it is moved on to display the automation system on the display unit in true three-dimensional representation including all machines, conveyor systems and all products before and after the assembly of all individual parts. An appropriate procedure is known to the skilled artist for example from U.S. Pat. No. 7,817,150 B2. The corresponding techniques of 3D rendering or 3D image synthesis are also known to the skilled artist. The basis for this is a three-dimensional data description of the components of the automation system, which is ideally true to scale. The sum of these data is called a scene. The modeling of the components and their sub-elements of the automation system within the scene is carried out by means of geometric modeling. The corresponding data is then loaded into a suitable graphics processor and, together with position and viewing direction data, an image of the automation system or the visible part of the automation system and its components is rendered using familiar computer graphics methods.

In the area of control stations for automation systems, however, the problem arises that the information density to be displayed and processed is immense. On the one hand, the interaction of the individual stations of the automation system and the correct production process should be representable and verifiable, but on the other hand, each individual station with its elements should also be representable and verifiable, down to individual components of elements of a station. The data of the three-dimensional scene therefore necessarily have a comparatively high degree of detail. However, this can mean that loading the individual objects of an image for rendering requires a considerable processing effort within the computer system and thus either takes a comparatively long time, or extremely expensive and energy-intensive hardware has to be used.

It is therefore the task of the invention to specify a process of the type mentioned above, which on the one hand processes and display all details necessary for the tasks of controlling an automation system, and on the other hand minimizes the required computing capacity.

This task is solved in accordance with the invention by storing in a data memory a tree structure in which nodes are assigned with the components of the automation system, wherein a focus component is determined, and only those components of the part of the automation system are rendered from the scene whose assigned nodes in the tree structure have only a predetermined maximum distance from the node assigned to the focus component.

The invention is based on the consideration that a reduction of the required computing power for rendering would be possible if not all components of the automation system were rendered in the field of view, but only a selection. Here, it was recognized that usually not all information is needed at the same time by the user, but he needs—already limited by the human receptivity—exclusively only a subset of the available components in the representation, depending on his current interest. To do this, the system first determines which component is of interest to the user, that is, it first determines a focus component. To decide which components are to be rendered, all components of the automation system, i.e. all objects present in the scene, are linked together in at least one tree structure.

In this application, the term tree structure is used in the usual definition from computer science, i.e. a data structure with which hierarchical structures can be mapped. The objects specified by the hierarchy are called nodes. Typically, each node stores a list of references to its child nodes, starting from a first node, the root. These references are called branches. It is then common to speak of child nodes for a subordinate node, and of parent nodes for the referring node. This also defines a distance between two nodes, namely the number of branches along which one has to move to get from one node to the other.

For example, the entire automation system can be assigned to the root of the tree structure. Their children can be the individual stations of the automation system and/or the conveyor systems. Child nodes of a station can be individual components of the station, such as a robot. Child nodes of the robot node can be its individual joint components, etc. The skilled artist will know how to arrange the hierarchy of the components of an automation system in a meaningful tree structure.

In a group of several jointly monitored automation systems, either a higher-level structure could form the root, or no physical component is assigned to the root. Here the root would then unite several plants under itself. In the case of several installations, several parallel tree structures could also be provided, some of which overlap, i.e. individual components could be represented in two tree structures.

In addition, several tree structures can be provided which differ in terms of content, i.e. with regard to the selection of the components contained and their hierarchical structure. The tree structure could be organized, for example, in terms of spatial structure, network topology, or other logical grouping. In the procedure described here, one can, for example, select one of the tree structures for display, depending on the role of the user.

As soon as the tree structure exists, and once the focus component has been determined the node assigned to this focus component can be identified. Starting from this node, all nodes are searched at a predetermined maximum distance, i.e. those that are only a certain maximum number of branches away. During rendering, only the components assigned to these nodes are rendered in the resulting image.

The focus component is determined from a user input in an advantageous embodiment of the method. In other words, the focus component is selected directly by the user. A such method makes it particularly easy and reliable to determine the focus component, since the change in the focus component is controlled rather than happening continuously. The user can directly enter and select the currently interesting component of the automation system. This can be done, for example, by clicking/tapping the corresponding component in the image currently displayed. Alternatively, a tabular list of different components can also be displayed, for example, with a selection of components for which user intervention is currently required, e.g. due to a malfunction. The selection can then also be made by clicking/tapping the component in the tabular display. Finally, a selection can also be made using a search function.

In a further advantageous embodiment of the method, different maximum distances are predefined for parent and child nodes of the node assigned to the focus component. This takes into account the fact that higher-level components may be of less interest to the user than lower-level components of the current focus component. By determining different maximum distances for child and parent nodes, this can be used to further reduce the resource consumption of the rendering, for example by specifying a smaller maximum distance for parent nodes. This allows a high level of detail for subordinate components without having to render a corresponding number of higher-level components.

Advantageously, the respective maximum distance is determined on the basis of a detail level setting made by a user. Such a determination takes particular account of the needs of the user. A user setting of the detail level allows the user to prioritize whether he prefers a higher level of detail or a faster rendering. The detail level setting can directly determine the maximum distance(s), or indirectly influence an automated determination of the maximum distances, which can depend on further circumstances.

A further reduction of the computing capacity required for the rendering process is advantageously achieved by displaying a component whose assigned node is a parent node of the node assigned to the focus component in the image only as a contour or a footprint. Since the higher-level component of the focus component in the current view is often of secondary interest to the user and is rather used for spatial orientation in relation to the focus component, it may be sufficient to display only the contour/footprint of the higher-level component and not to render the entire three-dimensional view of the higher-level components. This saves valuable computing capacity. Such an execution of the procedure can be activated, for example, by means of a corresponding graphic setting option, which can be selected by a user, in the corresponding software.

However, especially with high levels of detail or comparatively low-performance hardware, reloading, i.e. data transfer, model construction and transfer to the graphics processor, can be so computing-intensive that delays that are noticeable to the user are unavoidable. In order to indicate to the user that a component has not yet been completely represented with all subordinate components, a second component is graphically modified (compared to a predefined normal representation) during the loading of a first component from the scene whose assigned node is a child node of the second component from the scene in an advantageous embodiment, and only after the first component has been completely loaded, the second component is displayed in the predefined normal representation. In other words: As long as a data transfer process of subordinate components is still running, which are not yet completely represented in the resulting image, the superordinate component is represented differently, e.g. in a modified color or by an animated signal such as blinking. This makes the user aware that the loading process is not yet complete and that further components will be added.

In a further advantageous embodiment of the method, the position data and viewing direction data are determined on the basis of the spatial positioning of the display unit. Although the 3D environment should be freely navigable for the user—as shown above—it can often be difficult to find the displayed 3D environment in the real system due to the extreme complexity of production systems. Therefore, mobile display units should offer a possibility to adjust the position and viewing direction data to the current position of the display unit and thus of the user. This can be done, for example, the first time the procedure is executed when the software is activated, or by pressing a button provided on the display unit. In both cases, the 3D representation would start at the current (real) location and with the current viewing angle. From there, a kind of operator guidance could then take place through the plant, which the operator also follows in real life, for example according to the production sequence or an error frequency. Such determination of position and viewing direction data on the basis of spatial positioning also enables the use of virtual reality or augmented reality display units, such as VR glasses.

A further reduction of the rendering effort can be achieved by defining a number of categories and assigning one or more categories to a number of nodes of the tree structure, whereby from the scene only those components of the part of the automation system are loaded into the processor for rendering whose respective assigned nodes are assigned to a predefined category. In other words, the plant components are already subject to a kind of categorization when the necessary data structures are created. For example, categories can be: Media elements such as lines, cables, ducts or conveying elements or processing stations. If an operator then selects, e.g. the "Media" category, only these elements are taken into account as described. All others are then not displayed at all—or preferably only with minimal rendering. The categorization is independent of the selection of the current focus component but is already stored in the tree structure. If the categorization is changed, the display changes accordingly.

Advantageously, the method is interactive and rendering is carried out in real time. For this, it is advantageous to perform the rendering and display process steps again after each change of the position data or the viewing direction data by a user input. This results in a particularly comfortable operability for the user.

With such a real-time method, it is conceivable to determine the maximum distance for the components to be rendered dynamically. For this purpose, a performance parameter for the processor is determined during rendering, whereby the respective maximum distance is predetermined on the basis of the performance parameter the next time the rendering is carried out. In other words, the rendering performance is continuously determined, e.g. based on the duration of a rendering process or other processor characteristics, and the determined performance is used to determine the respective maximum distance. This way, a smaller maximum distance can be used fully automatically for less powerful graphics hardware.

The user input for changing the position and viewing direction data can be done with known techniques for 3D navigation, e.g. on touch screens with two fingers. In a particularly advantageous embodiment of the method, however, it is carried out in such a way that the display unit is touch-sensitive and a screen edge area is provided, wherein a longitudinal change in the viewing direction data is carried out with a horizontal touch input in the screen edge area and/or a latitudinal change in the viewing direction data 8 is carried out with a vertical touch input in the screen edge area. This allows the user—by touching the edge of the screen—to change the viewing direction without losing sight of the automation system or its components themselves.

Advantageously, the screen border area comprises a horizontal and a vertical bar area, where the horizontal touch input takes place in the horizontal bar area and the vertical touch input takes place in the vertical bar area. Such an arrangement of the contact areas for changing the viewing direction is particularly intuitive and technically easy to implement.

A computer program product advantageously includes software code sections that, when executed on a processor, cause the processor to perform the described method. Such a computer programs can, for example, be designed as a so-called "App" for tablet computers.

In a control system for an automation system, comprising at least one processor and one display unit, it is advantageous to carry out the described method on the at least one processor. The processor is designed as a graphics processor into which the model data for the components are loaded, e.g. from a central processing unit.

It is advantageous to place the display unit on a mobile unit connected to the automation system and/or other components of the control system via a wireless communication link. Such a unit can be a tablet computer, for example.

The advantages achieved with the invention consist in particular in the fact that by selecting the components of an automation system to be displayed in a 3D representation on the basis of their assignment to a tree structure, on the one hand the computing capacity required for rendering is minimized and on the other hand a particularly intuitive and clear representation is generated for the user. In particular, this enables smooth real-time rendering with appropriate interaction, so that the display can be influenced by translations, rotations and zooming in such a way that all locations of interest can be displayed on a suitable scale. The three-dimensional representation of the factory and its facilities allows a much more intuitive navigation. Problematic situations can be displayed much more comprehensibly in their environment. New employees can recognize general interrelationships in the factory much more easily. Also for customers, the traceability of the production of their product within the factory is very welcome.

Exemplary embodiments of the invention are explained in more detail using drawings, in which.

Like parts are marked with like reference signs in all figures.

Figure 1:
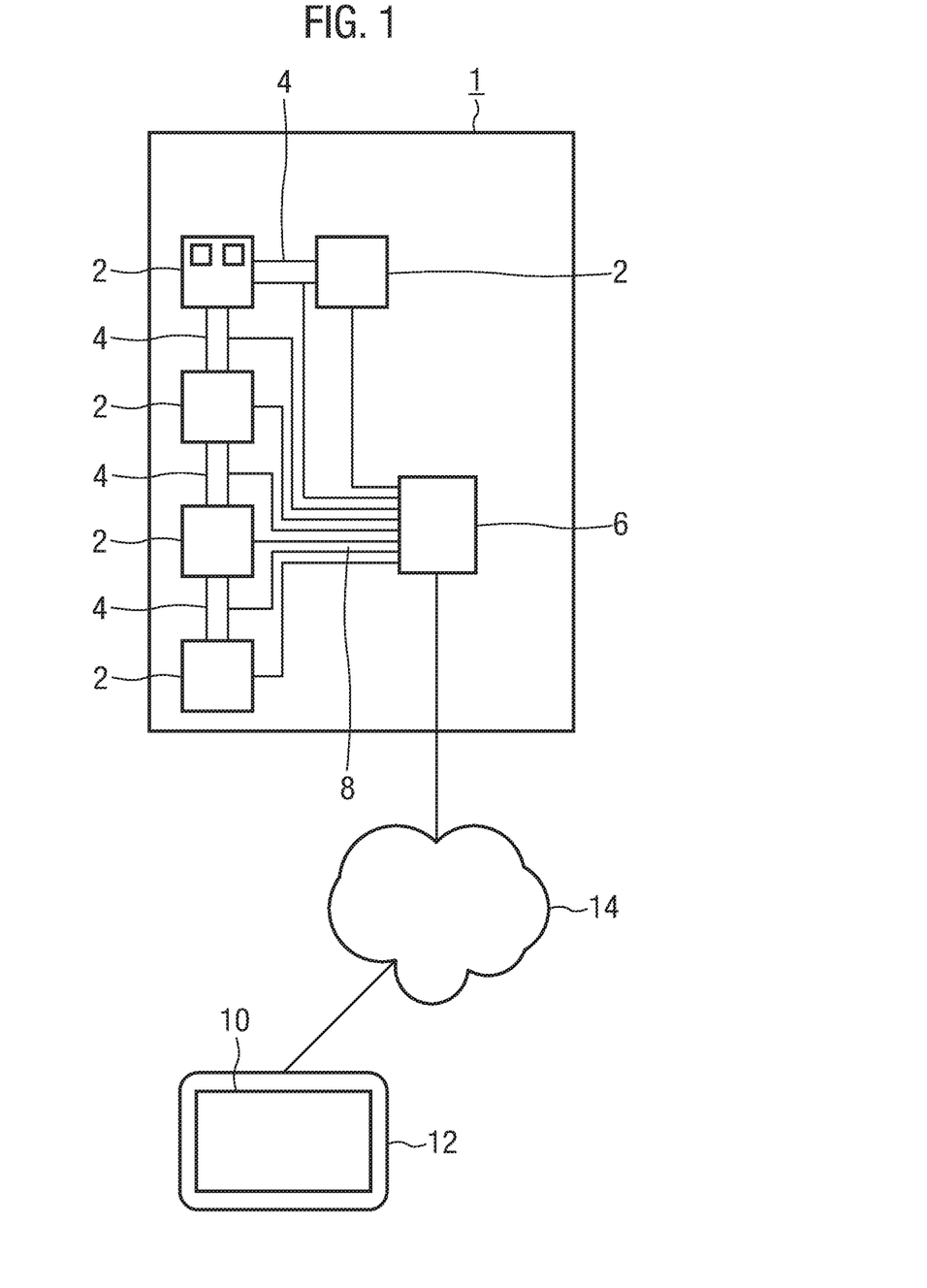
FIG. 1 shows a schematic representation of an automation system with various components and a control system with a mobile unit.

FIG. 1 shows schematically an automation system 1, i.e. an industrial plant in which production and processing steps are automated. The industrial plant comprises a large number of components, including processing stations 2, to which products to be processed or their precursors are transported. This is done by means of conveyor equipment 4, e.g. conveyor belts.

The control and monitoring of automation system 1 takes place in a control system 6, where the process sequences are monitored and, if necessary, influenced by a user with the help of corresponding data from automation system 1. The control system 6 has one or more devices or data connections 8 to devices on the various components 2, 4 of automation system 1 for measuring, regulating, controlling, displaying, alarming, recording, switching or calculating.

The process is displayed via a display unit 10, in the exemplary embodiment designed as a screen on a mobile unit 12, here a tablet computer, which is connected to the control system 6 via a wireless data connection 14 as part of the control system 6. This offers the user the possibility of displaying and controlling automation system 1 while moving freely within automation system 1.

On display unit 10, automation system 1 is displayed in true three-dimensional representation including all components 2, 4 and all products currently being processed before and after assembly. Rendering takes place in real time, so that on the one hand the display is interactive, i.e. the user can change the viewing angle and position by making appropriate entries, whereby the 3D display changes immediately accordingly, and on the other hand a dynamic image of automation system 1 is also possible, in which actually moving components such as products to be processed are displayed and moved in real time at their actual location. Appropriate software is installed in the control system 6 and mobile unit 12 for this purpose and for all other functions described below.

The representation of automation system 1 is as true to scale as possible, i.e. all components 2, 4 are represented at least schematically in their actual size and form as well as in true-to-scale position and distance to each other. Deviations from this can be made—for the purpose of an improved representation—as long as the user can still identify which real component corresponds to a representation. The basis for this is a three-dimensional data description of components 2, 4 of automation system 1, the so-called scene. This was generated by geometric modeling. The corresponding model data is selected by a central processing unit and loaded into a graphics processor of the mobile unit 12. The model data can also be stored on a central server of the control system 6 and transferred to mobile unit 12 as required. Together with current position and viewing direction data—depending on the performance of the graphics processor (GPU)—the visible part of automation system 1 with its components 2, 4 is then cyclically rendered by the GPU, ideally several times per second using known methods of computer graphics, and displayed on the display unit 10.

Figure 2:
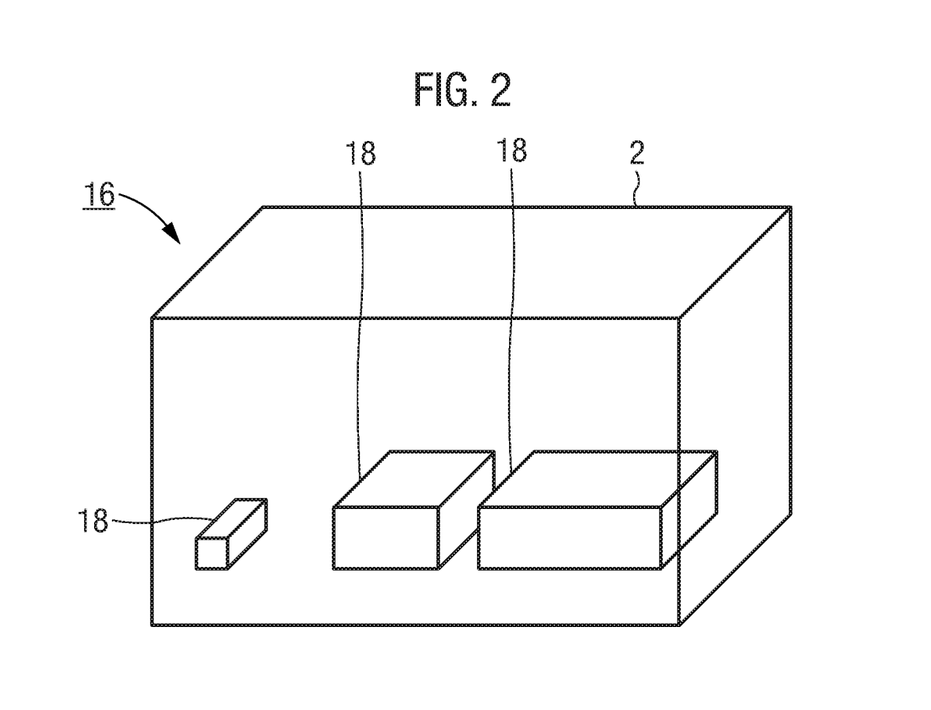
FIG. 2 shows a three-dimensional rendered image of a part of the automation system.

An example of such a rendered image 16, as shown on display unit 10, is shown in FIG. 2. For the sake of simplicity, all components 2, 4 of automation system 1 are shown here and below as cuboids, but in reality they will have more complex shapes. Image 16 shows a rendered representation of a processing station 2 comprising three subcomponents 18. This is the case in every automation system 1: Each processing station 2 will consist of different parts (robot arms, processing machines, etc.). These are also largely to scale in the 3D representation in image 16 and are rendered by the processor.

The representation of processing station 2 is semi-transparent in FIG. 2, so that the internal sub-components 18 are visible. Such a representation is provided for in the exemplary embodiment when selecting processing station 2 as the focus component during the transition to the new representation, as will be explained below.

However, in reality the individual subcomponents 18 will also consist of subcomponents 20. This is shown as an example in image 22 in FIG. 3, in which two of the three subcomponents 18 in turn comprise several subcomponents 20. A robot arm consists e.g. of a multitude of motors, grippers, arm joints etc. This can be continued as desired. Each motor again consists of different parts, these parts can include different components etc. Insofar these individual parts are encompassed by control system 6 of automation system 1, an object must be stored in the scene representing automation system 1 for each of these components and sub-components and this must be displayed in images 16, 22 during rendering so that the user can carry out a corresponding analysis and, if necessary, carry out control interventions.

The problem here is that rendering the image 16, 22 requires very powerful hardware and, in particular, loading the model data into the GPU requires comparatively high data rates. This applies particularly to control systems 6, which control very large and/or complex automation systems 1, and in which a comparatively high number of objects are present in the scene stored on the data side.

To solve this problem, a tree structure 24 is created on the data side and stored in a memory of the control system 6. Tree structure 24 is shown partly in FIG. 4 and is only an example of several possible tree structures 24, which can be structured differently with regard to content and hierarchy depending on the application purpose and role of the respective user. Several parallel tree structures can also be stored on the data side.

Figure 4:
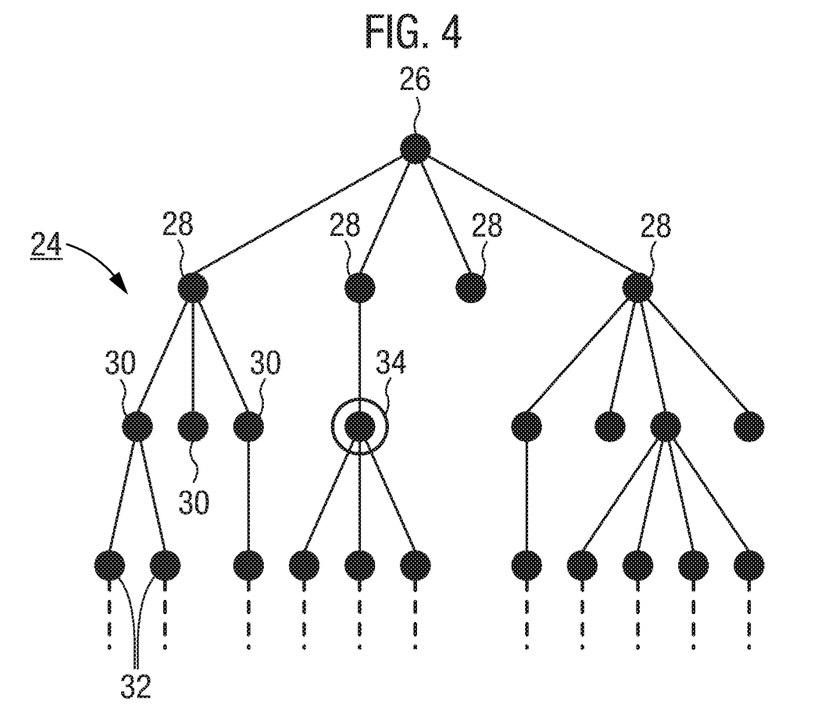
FIG. 4 shows a tree structure whose nodes are assigned to the components of the automation system.

In the exemplary embodiment, root 26 is assigned to tree structure 24 of automation system 1; the other nodes 28, 30, 32 are ordered into hierarchy levels and are each assigned to one of the components, i.e. a processing station 2, a conveyor equipment 4, a sub-component 18 and other component 20. Each component of automation system 1 addressed by control system 6 and stored as an object in the data scene for rendering is assigned to nodes 28, 30, 32. The hierarchy of nodes 28, 30, 32 in the tree structure represents the actual hierarchy of components in automation system 1 explained above.

Figure 3:
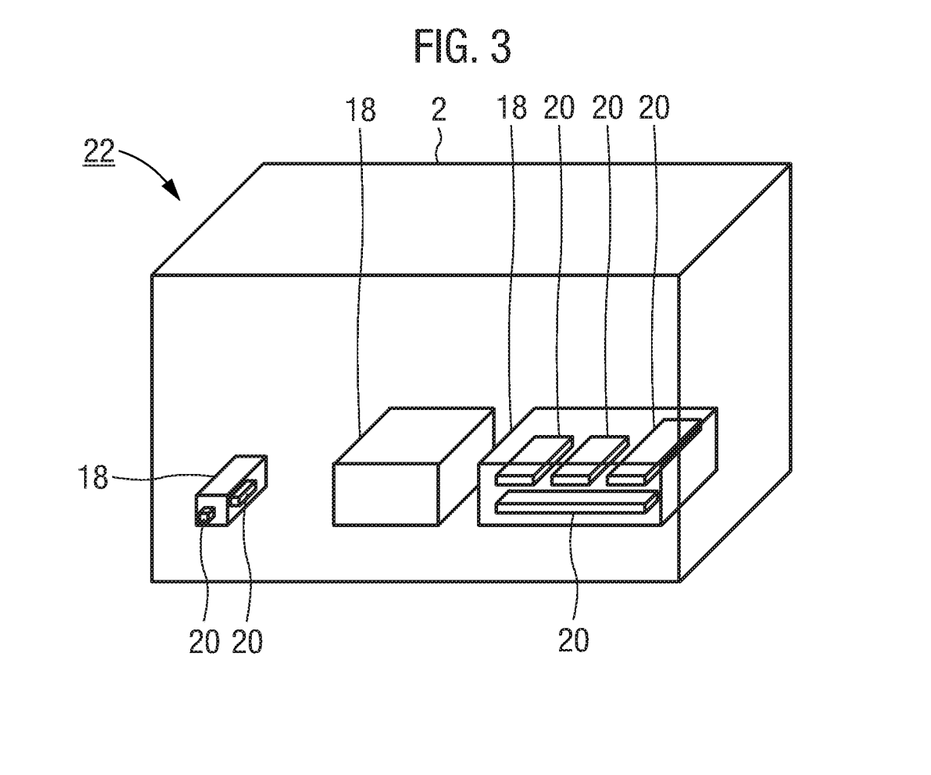
FIG. 3 shows a three-dimensional rendered image of the part of the automation system with a higher degree of detail.

Using tree structure 24, the components 2, 4, 18, 20 to be displayed on display unit 10 are selected during real-time rendering of images 16, 22, starting with a focus component, i.e. a component that is currently in focus for the user. This is done by direct user selection, i.e. by clicking/tapping the desired component in the 3D display, in a tabular list, or by a search function.

The node 34 assigned to the determined focus component is then determined in tree structure 24. Starting from this node 34, those nodes 28, 30, 32 are determined which have only a certain distance from node 34 of the focus component, i.e. which can be reached over a certain maximum number of branches. In the exemplary embodiment, the maximum distances for higher or lower-level components are different. Then only the components 2, 4, 18, 20 assigned to these nodes 28, 30, 32 are rendered and shown in FIGS. 16, 22. This is done by transferring only the model data of these determined nodes 28, 30, 32 to the GPU for rendering.

Different determination procedures for the maximum distances are implemented in different exemplary embodiments not shown in pictures. In a first exemplary embodiment, the maximum distances are set directly by a user. For this purpose, a detail level setting is carried out by the user, which directly specifies the maximum distances or indirectly determines the maximum distances from the detail level setting. In a second exemplary embodiment, the maximum distances are determined dynamically: For this purpose, a performance or speed measurement of the rendering takes place during the rendering process. From the result, a performance indicator is determined, which ultimately indicates the performance of the processor or its performance during the rendering process. The maximum distances are then determined on the basis of this performance indicator, whereby higher distances are selected for better performance and thus more components 2, 4, 18, 20 are displayed. This can also result in the maximum distances being changed depending on the current viewing angle and the number of subcomponents of the current focus component and not being constant for all consecutive rendering processes.

The maximum distances can also be adjusted according to the current situation. In the exemplary embodiment, for example, other maximum distances are defined during the transition from one focus component to the next. Thus, after selecting a new focus component (e.g. processing station 2 in FIG. 2), the new focus component is displayed semi-transparently and the subordinate components are shown as shown in FIG. 2 (increasing the maximum distance in the direction of the subordinate hierarchy). This is followed by an automatic zoom process, i.e. the newly selected focus component is moved to the foreground by changing the viewing angle and location accordingly. Only then are higher-level components hidden (reduction of the maximum distance in the direction of the higher-level hierarchy) or only displayed as a footprint.

To further improve performance, there is also a setting that can be selected by the user, which leads to higher-level components in the tree structure 24 not being completely rendered, that is, parent components of the current focus component, are not completely rendered, but rather only their contour or outline is rendered.

In other exemplary embodiments, a number of categories are defined and one or more categories are assigned to individual or all nodes 28, 30, 32, 34 of tree structure 24. For example, categories can be: Media elements such as lines, cables, ducts or conveying elements or processing stations. One or more of these categories can then be selected by the user or automatically based on a user role. During rendering, only those components of the part of automation system 1 are loaded into the processor for rendering from the scene whose respective assigned nodes 28, 30, 32, 34 are assigned to a predefined category. All others are then not displayed at all—or only with minimal rendering.

Figure 5:
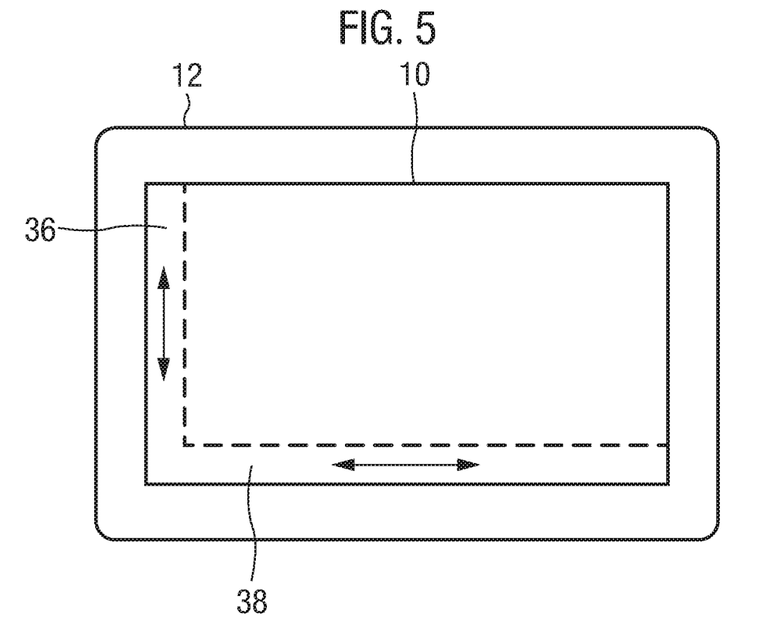
FIG. 5 shows a mobile unit with a touch-sensitive display unit.

The input and change of the position and viewing direction data by the user is carried out in the exemplary embodiment via inputs on the display unit 10, which is shown in FIG. 5. The rectangular screen of display unit 10 is touch-sensitive. At the left edge of the screen there is a vertical bar area 36, which extends over the entire height of the screen. At the bottom of the screen is a horizontal bar area 38 that extends across the entire width of the screen. In the design example, the bar areas 36, 38 occupy approximately 10% of the entire screen area, but can also be narrower or wider.

When an object touching the display unit 10, e.g. a finger, moves horizontally, the viewing direction data changes longitudinally. Similarly, when moving vertically in the vertical bar area 36, a latitudinal change in the viewing direction data is performed. The position data can be changed, for example, by zooming with two fingers moving towards or away from each other. This allows the user to focus on the components of interest 2, 4, 18, 20. Alternatively, the corresponding locations/components can also be searched for directly using search functions.

Figure 6:
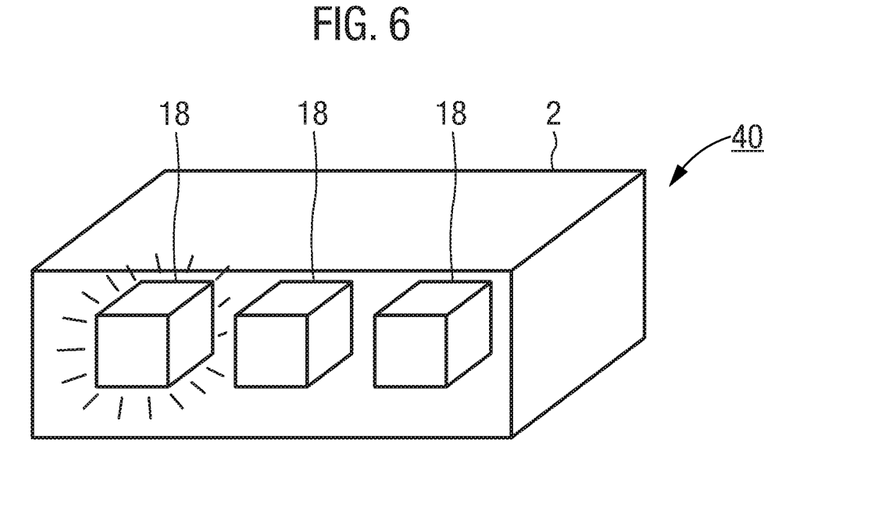
FIG. 6 shows another three-dimensional image of a part of the automation system during rendering.

During rendering, there may still be waiting times when loading model data from child components 2, 4, 18, 20, despite the above measures for acceleration and selection of components to be displayed. To indicate to the user that subcomponents are still missing for a displayed component, but these have not been completely loaded, this component is graphically modified during the still incomplete loading process. This is shown in FIG. 6, which shows image 40 during the still incomplete loading process. The left component 18 in image 40 is already shown, but subordinate components are still missing that have not yet been fully loaded and rendered. Therefore, the left component 18 flashes. After complete loading and rendering of the subcomponents, component 18 is then displayed in the normal manner.

In a further exemplary embodiment not shown separately, the mobile unit 12 has means for spatial localization within automation system 1. This makes it possible to adjust the viewing angle and the location in the 3D display on display unit 10 to the current viewing angle and location of the mobile unit 12 and thus of the user. This is done, for example, when the mobile unit 12 is started up or when a "Home" button is clicked/tapped.

LIST OF REFERENCE SIGNS 1 automation system
2 processing station
4 conveyor equipment
6 control system
8 data connection
10 display unit
12 mobile unit
14 wireless data connection
16 image
18 subcomponent
20 component
22 image
24 tree structure
26 root
28, 30
32, 34 node
36 vertical bar area
38 horizontal bar area
40 image

The invention claimed is:

1. A method for controlling an automation system, comprising:
    rendering, by a processor, an image from a three-dimensional scene representing at least part of the automation system on the basis of position data and viewing direction data;
    displaying the image on a display unit;
    wherein the automation system comprises a plurality of components, wherein a tree structure is stored in a data memory in which nodes are assigned to the plurality of components of the automation system;
    determining a focus component that is selected through a user input, and from the scene only a portion of the plurality of components of the part of the automation system are loaded into the processor for rendering whose nodes in the tree structure have only a predetermined maximum distance from a node assigned to the focus component.

2. The method according to claim 1, wherein the focus component is determined from the user input by at least one of selecting the focus component displayed on the display unit, selecting the focus component from a list of the plurality of components on the display unit, and selecting the focus component using a search function on the display unit.

3. The method according to claim 1, wherein different maximum distances are predetermined for parent and child nodes of the node assigned to the focus component.

4. The method according to claim 1, wherein the respective maximum distance is predetermined on the basis of a detail level setting made by a user.

5. The method according to claim 1, wherein a component whose assigned node is a parent node of the node assigned with the focus component is represented in an image only as a contour or a footprint.

6. The method according to claim 1, wherein during loading of a first component from the scene whose assigned node is a child node of a second component from the scene, the second component is graphically changed in the image compared to a predetermined normal representation, and only after the first component has been completely loaded, the second component is displayed in the predetermined normal representation.

7. The method according to claim 1, wherein the position data and viewing direction data are determined on the basis of the spatial positioning of the display unit.

8. The method according to claim 1, wherein a number of categories is defined and one or more categories are assigned to a number of nodes of the tree structure, where only those components of the part of the automation system are loaded into the processor for rendering from the scene whose respectively assigned nodes are assigned to a predefined category.

9. The method according to claim 1, wherein after each change of position data or viewing direction data by user input, the rendering and displaying are performed newly.

10. The method according to claim 9, wherein a performance parameter for the processor is determined during rendering, wherein during the next time the rendering is performed the respective maximum distance is predetermined on the basis of the performance parameter.

11. The method according to claim 9, in which the display unit is touch-sensitive and a screen edge region is provided, and wherein a longitudinal change in the viewing direction data is performed at a horizontal touch input in one of the screen edge region and a latitudinal change in the viewing direction data is performed at a vertical touch input in the screen edge region.

12. The method according to claim 11, wherein the screen edge region comprises a horizontal and a vertical bar region, wherein the horizontal touch input is in the horizontal bar region and the vertical touch input is in the vertical bar region.

13. A non-transitory computer program product comprising software code sections which, when executed on a processor, cause the processor to perform operations comprising:
   rendering, by a processor, an image from a three-dimensional scene representing at least part of the automation system on the basis of position data and viewing direction data;
   displaying the image on a display unit;
   wherein the automation system comprises a plurality of components, wherein a tree structure is stored in a data memory in which nodes are assigned to the plurality of components of the automation system;
   determining a focus component that is selected through a user input, and from the scene only a portion of the plurality of components of the part of the automation system are loaded into the processor for rendering whose assigned nodes in the tree structure have only a predetermined maximum distance from a node assigned to the focus component.

14. A control system for an automation system, comprising a processor and a display unit, configured to perform one or more operations comprising:
   rendering an image from a three-dimensional scene representing at least part of the automation system on the basis of position data and viewing direction data;
   displaying the image on a display unit;
   wherein the automation system comprises a plurality of components, wherein a tree structure is stored in a data memory in which nodes are assigned to the plurality of components of the automation system;
   determining a focus component that is selected through a user input, and from the scene only a portion of the plurality of components of the part of the automation system are loaded into the processor for rendering whose assigned nodes in the tree structure have only a predetermined maximum distance from a node assigned to the focus component.

15. The control system according to claim 14, wherein the display unit is arranged on a mobile unit connected to at least one of the automation system and other components of the control system by a wireless communication link.

* * * * *